Sept. 20, 1938.  D. G. MAGILL  2,130,355

METHOD OF FORMING MOISTUREPROOF AND GREASEPROOF CONTAINERS

Filed June 27, 1936

INVENTOR
Donald G. Magill
BY Ivan D. Thornburg
Charles H. Line
ATTORNEYS

Patented Sept. 20, 1938

2,130,355

UNITED STATES PATENT OFFICE 2,130,355

METHOD OF FORMING MOISTUREPROOF AND GREASEPROOF CONTAINERS

Donald G. Magill, Great Neck, N. Y., assignor to American Can Company, New York, N. Y., a corporation of New Jersey Application June 27, 1936, Serial No. 87,775

2 Claims. (Cl. 93—94)

The present invention relates broadly to a method of forming moisture-proof and grease-proof fibre tubing from which containers or cans are produced and is similar to the method disclosed in my United States Patent 1,689,593, issued October 30, 1928, on Process and apparatus for forming grease-proof fibre containers, the present invention having particular reference to a method of lining such mandrel wound fibre tubing with a metallic foil coated with a moisture-proof and grease-proof lacquer which serves as a lubricant for the foil while on the forming mandrel and which when dried closes up any microscopic pores in the foil whereby a can body made from the tube is impervious to moisture and grease.

In the manufacture of fibre cans on a commercial scale the making of the can body is usually and most economically effected by winding strips of paper or other fibrous material continuously on the forming mandrel of a helical or so-called spiral winding machine to form tubing from which the bodies may be cut off in any desirable lengths. For a number of years, unsuccessful attempts have been made to line the inside of this tubing with metallic foil, particularly aluminum foil, while being wound, to render can bodies, produced from the tubing, impervious to moisture and grease.

Two outstanding difficulties are inherent in such a lining process. First, the tendency of the metallic foil to cling or stick to the mandrel when wound thereon because of the high coefficient of friction between foil and mandrel, and second, the presence of pervious microscopic pores in the foil which is bound to occur in foil reduced to a thickness of a few thousandths of an inch, such a thin foil being necessary in point of cost if it is to be used profitably as a liner for can bodies.

The instant invention contemplates a method of lining such tubing with thin metallic foil in a manner which overcomes these difficulties and by the use of a moisture-proof and grease-proof lacquer containing a volatile solvent, which is applied to the strip of foil just prior to its being wound on the mandrel. The lacquer is put on the face of the foil which contacts the mandrel and thus serves as a lubricant for the advancing foil, the lacquer being confined between the foil and the mandrel so that the volatile solvent is prevented from escaping. As the foil lined tubing runs off the end of the mandrel, the inner lacquered surface of the foil is exposed to the drying action of the air which dissipates the volatile solvent and leaves a hard coating thereon. This lacquer coating seals the microscopic pores of the foil thereby rendering a can body made from the tubing impervious to moisture and grease.

An object, therefore, of the instant invention is the provision of a method of lining with metallic foil fibre tubing formed on a mandrel and from which moisture-proof and grease-proof can bodies may be produced wherein the face of the foil that contacts the mandrel is coated with a moisture-proof and grease-proof lacquer containing a volatile solvent which serves as a lubricant for reducing the friction between foil and mandrel during the forming operation and which seals any microscopic pores in the foil upon exposure to drying whereby a can body made from the tubing is impervious to moisture and grease.

Another object is the provision of such a method of lining can body tubing with metallic foil wherein the edges of the foil are overlapped and are sealed down with the impervious lacquer and by winding pressure so that drying of the lacquer forms a continuous moisture-proof and grease-proof impervious coating on the foil whereby a can body made from the tubing is impervious to moisture and grease.

Numerous other objects and advantages of the invention will be apparent as it is better understood from the following description, which, taken in connection with the accompanying drawing, discloses a preferred embodiment thereof.

Referring to the drawing.

Figure 1:
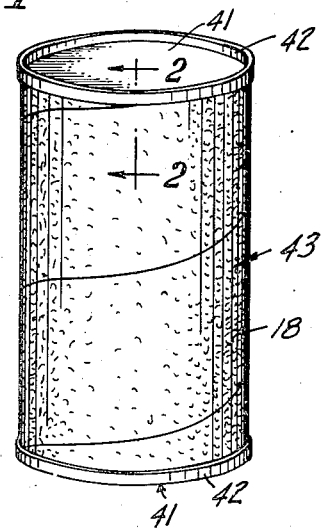
Figure 1 is a perspective view of a can having a fibre body lined with a metallic foil applied thereto in accordance with the instant method invention.

By way of illustrating the invention, there is shown on the drawing the principal parts of one form of helical winding machine such as the one disclosed in my United States patent hereinbefore mentioned. The machine comprises primarily a main frame 11 carrying a clamp block 12 which supports one end of a stationary cylindrical mandrel 14 on which the fibre tubing is wound.

Figure 3:
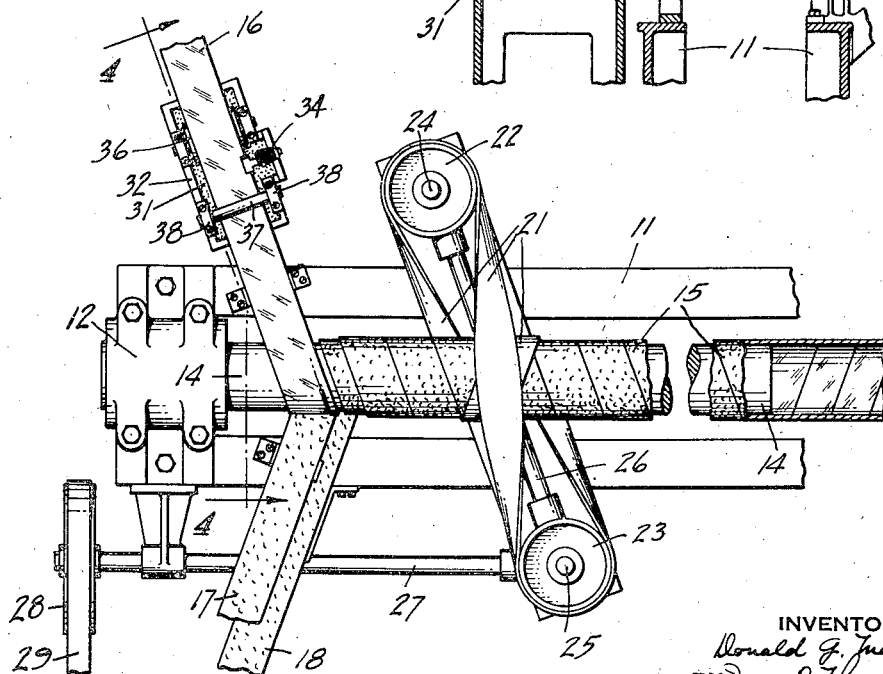
Fig. 3 is a top plan view of one form of apparatus for carrying out the steps of the instant method invention parts being broken away.

The tubing (indicated by the numeral 15) is formed from a plurality of strips of material which are passed onto the mandrel 14 over the top of each other and at an angle as shown in Fig. 3 to form a helically wound tube having a plurality of layers and having the edges of each strip overlapping itself so as to provide individual but continuous layers.

One of these strips (marked 16) is a metallic foil which is used as the liner for the tube. The other strips, of which there are preferably two (marked 17, 18), are paper or other fibrous material and are wound on the mandrel over the top of the foil liner. The fibre strips are preferably coated on one side with an adhesive in the usual manner, to bind or cement the layers of fibre together and this will stick the fibre strips and foil liner together.

The tubing 15 is wound on and advanced along the mandrel 14 by a continuously moving endless belt 21 which is carried on pulleys 22, 23 and which is wound around the mandrel at an angle as shown in Fig. 3. This arrangement of the belt on the mandrel exerts considerable pressure on the strips so that they are formed into a compact body wall.

The pulleys 22, 23 are mounted on vertical shafts 24, 25, respectively, which are rotated in unison and in opposite directions by a suitable connection, such as by bevel gearing, to a cross shaft 26. This shaft is in turn rotated by connection with a main driving shaft 27 having a driving pulley 28 which is revolved in any suitable manner as by belt 29.

Figure 4:
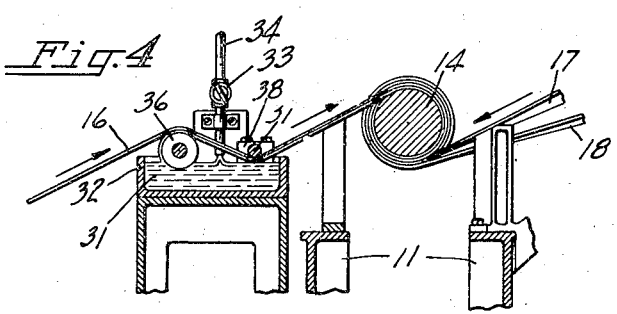
Fig. 4 is a sectional detail of the apparatus, the view being taken substantially along the broken line 4—4 in Fig. 3.

In accordance with the present method invention the metallic foil strip 16 as it is wound onto the mandrel 14 is coated on its mandrel engaging surface with a moisture-proof and grease-proof lacquer containing a suitable volatile solvent to make it quick-drying and easy to apply. The lacquer (marked 31, Fig. 4) is preferably held in a tank 32 located under the path of travel of the strip 16 (see also Fig. 3) and is maintained at a substantially constant level by adjustment of a valve 33 in a lacquer pipe line 34 which leads into the tank. The lacquer is applied to the foil strip as it passes onto the mandrel by a roller 36 which is disposed in the tank and which engages against the surface of the strip. A rod 37 carried in blocks 38 secured to the top edge of the tank and under which the strip is threaded, insures maximum contact of the strip with the roller.

The lacquer carried on the foil strip is confined under the tubing between the foil and the mandrel as the tubing is rotated and is spread out over the entire inner foiled surface of the tubing. The confining of the lacquer in this manner prevents escape of the volatile solvent thereby keeping the lacquer in a fluid state. It thus acts as a lubricant for reducing the friction between the foil liner and the mandrel. Sticking of the foil to the mandrel or breaking and blackening of the surface of the foil which would otherwise be due to a high coefficient of friction is thereby prevented.

As the lubricated and formed tube 15 is advanced under the endless belt 21 the winding pressure exerted by the belt compresses the overlapped and lacquer coated edges of the foil liner into tight engagement. This seals down the edges of the foil liner and provides a continuous foil lined inner surface for the tube.

As the foil lined tube 15 leaves the end of the mandrel its lacquered foil lining 16 is exposed to a drying action. Usually the atmosphere is sufficient for quick drying but if desired, forced drying may be used as by playing a jet of heated air or a jet of dry steam into the tube. In any event, the volatile solvent is rapidly dissipated, which action leaves a hard coating of lacquer on the inner surface of the foil lining. This seals or closes any microscopic pores in the foil making the tube impervious to moisture and grease.

Figure 2:
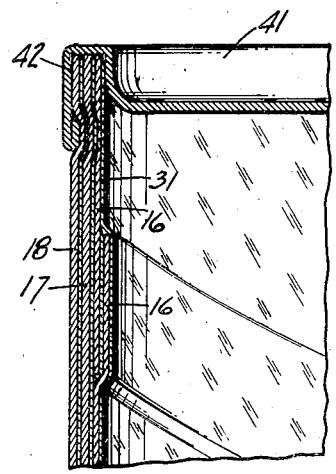
Fig. 2 is an enlarged fragmentary sectional view of an upper corner of the can, the view being taken substantially along the line 2—2 in Fig. 1.

The tube 15 may be then cut into desired body lengths in the usual manner and end members 41 (Figs. 1 and 2) may be secured thereto as by seams 42 to form cans 43. The cutting of the tube into body lengths forms no part of this invention and may be done either before or after the tube leaves the mandrel 14. A can body thus cut from such a foil lined tube 15 will be impervious to moisture and grease, the entire inner surface of the can body being lined with metallic foil having its edges overlapping and sealed down with a dried lacquer which also covers the entire surface of the foil and seals or closes any microscopic pores therein.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of forming moisture-proof and grease-proof can bodies having metallic foil liners, which comprises applying a moisture-proof and grease-proof lacquer containing a volatile solvent to a strip of metallic foil, winding said lacquered strip onto a can forming mandrel with substantially all of its lacquer surface in contact with said mandrel to obtain a spreading of the lacquer by the mandrel, overlapping the edge portions of said lacquered foil strip as it is wound upon the mandrel so that the lacquer is spread over the entire unlapped inner surface of the foil and is also spread onto the mandrel, feeding strips of fibrous material coated with adhesive upon the mandrel over the top of the foil and confining the volatile solvent of the lacquer between foil and mandrel, rotating and advancing the resulting tube along the mandrel, the confined lacquer at such a time serving as a lubricant for the foil, sealing together by the winding and advancing pressure the overlapped edge portions of the lacquered foil strip to provide a continuous moisture and grease proof metallic coating on the inner surface of the tube, and thereafter drying the lacquered interior of the tube, the volatile solvent escaping and leaving a thin film of dried lacquer on the inner surface of the tube thus closing any microscopic pores in the foil and thus producing a can body tube which is impervious to moisture and grease.

2. The method of forming moisture-proof and grease-proof can bodies having metallic foil liners, which comprises applying a moisture-proof and grease-proof lacquer containing a volatile solvent to a strip of metallic foil, winding said lacquered strip onto a can forming mandrel with its edges overlapped and with substantially all of its lacquer surface in contact with said mandrel so that the lacquer is spread by the mandrel over the entire unlapped inner surface of the foil and is also spread onto the mandrel, feeding strips of fibrous material coated with adhesive upon the mandrel over the top of the foil and confining the volatile solvent of the lacquer between foil and mandrel, rotating and advancing the resulting tube along the mandrel, the confined lacquer at such a time serving as a lubricant for the foil, sealing down the overlapped edges of the foil with the lacquer by winding pressure to provide a continuous moisture and grease-proof metallic layer on the inner surface of the tube, and drying the lacquered interior of the tube, the volatile solvent escaping and leaving a continuous moisture-proof and grease-proof impervious coating on the foil, thus producing a can body which is impervious to moisture and grease.

DONALD G. MAGILL.